Feb. 28, 1933.  A. NEILSEN  1,899,519
WATERING TROUGH FOR POULTRY
Filed April 30, 1930   2 Sheets-Sheet 1
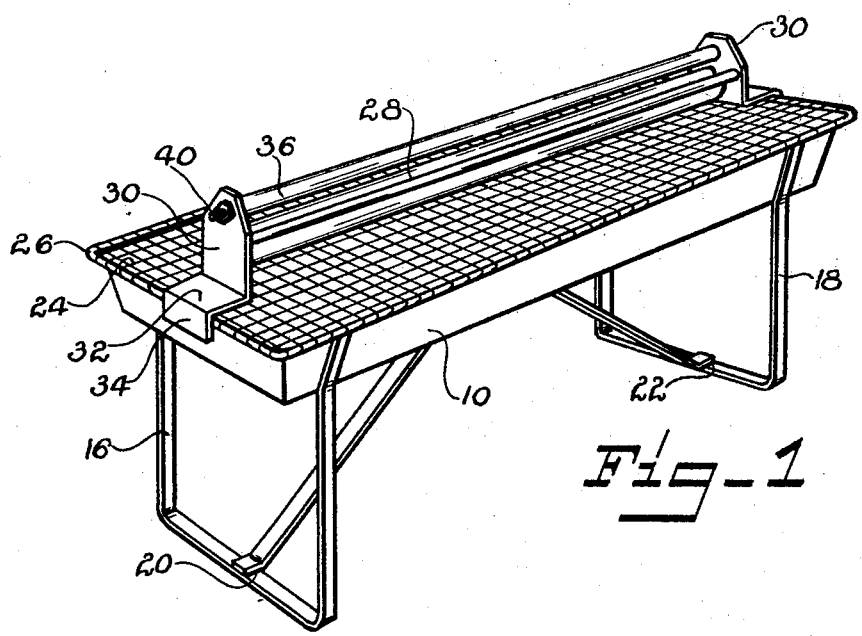
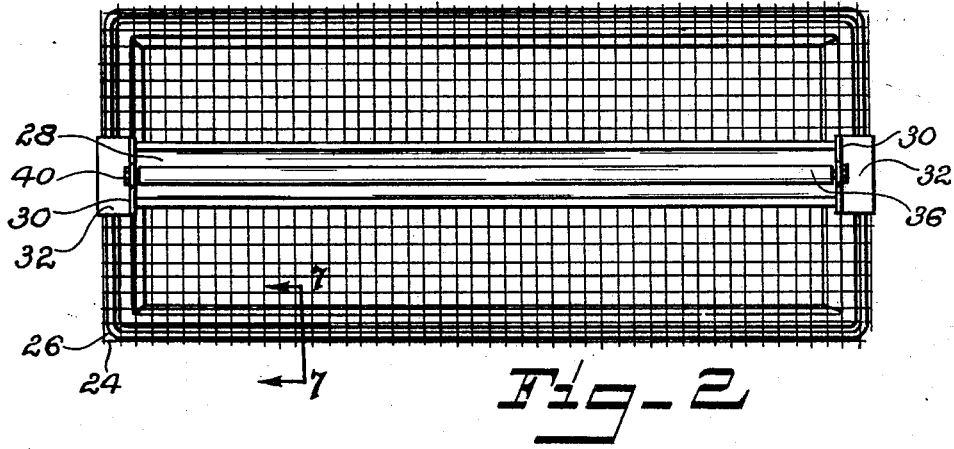
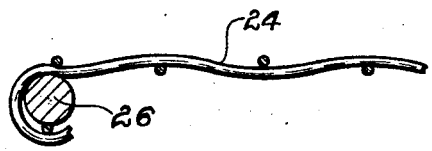
INVENTOR
Alfred Neilsen
BY Smith & Tuck
ATTORNEYS Feb. 28, 1933.  A. NEILSEN  1,899,519
WATERING TROUGH FOR POULTRY
Filed April 30, 1930   2 Sheets-Sheet 2

INVENTOR
Alfred Neilsen
BY Smith & Tuck
ATTORNEYS

Patented Feb. 28, 1933

1,899,519

UNITED STATES PATENT OFFICE

ALFRED NEILSEN, OF KIRKLAND, WASHINGTON

WATERING TROUGH FOR POULTRY

Application filed April 30, 1930. Serial No. 448,445.

My present invention relates to poultry raising devices and more particularly to a watering trough for poultry.

Many devices have been devised in the past for supplying poultry, particularly chickens, with drinking water. The majority of the devices supplied to chicken raisers, however, have had the fault of spreading water about the straw or ground upon which the watering device is placed. This is occasioned by the peculiar way in which a chicken drinks. A chicken when drinking normally places its beak into the water and then raises its head and allows the water to run down its throat, it not being possible for a chicken to suck water up as most animals do. It has been found by experience that a chicken will usually have about as much water on the outside of its beak as inside, and when it raises its head this excess water will run down the feathers of the neck and breast and drop upon whatever the chicken may be standing on. Now, in dry climates, or during the dry season, this is immaterial, but during the winter months and during damp seasons this excess water tends to make the ground, if the device rests upon ground, muddy. If the device rests upon straw as is the most common practice, the straw becomes damp. In either case the chicken's feet are then cold and damp, and most of the ills of chickens can be traced to this cause. It is to overcome this condition that I have provided my improved drinking trough, therefore:

The principal object of my invention is to provide a drinking trough for poultry that makes it impossible to wet the floor or ground about the drinking trough.

A further object is to provide a drinking trough which will collect all surplus water that the chickens may remove from the drinking trough proper, and not actually drink.

A further object is to provide a device of the character described which may be very easily kept in a clean and sanitary condition.

A still further object is the provision of means which prevents a chicken getting into the drinking water trough.

Figure 3:
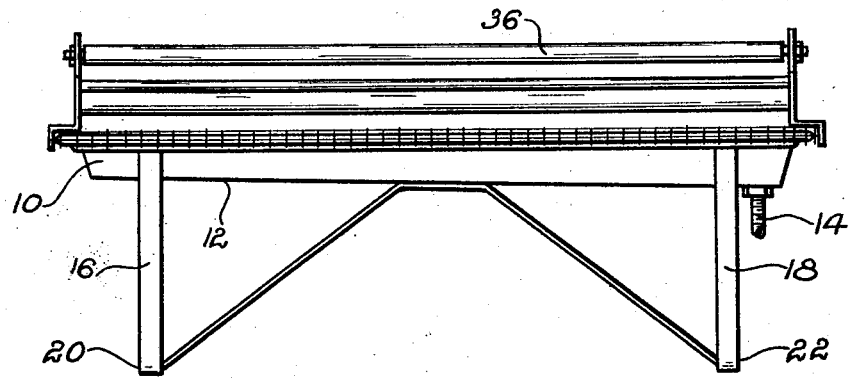
Figure 4:
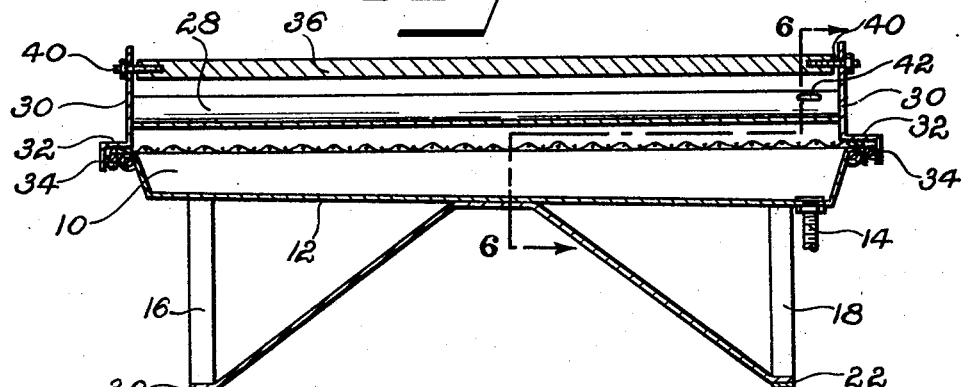
Figures 5, 6:
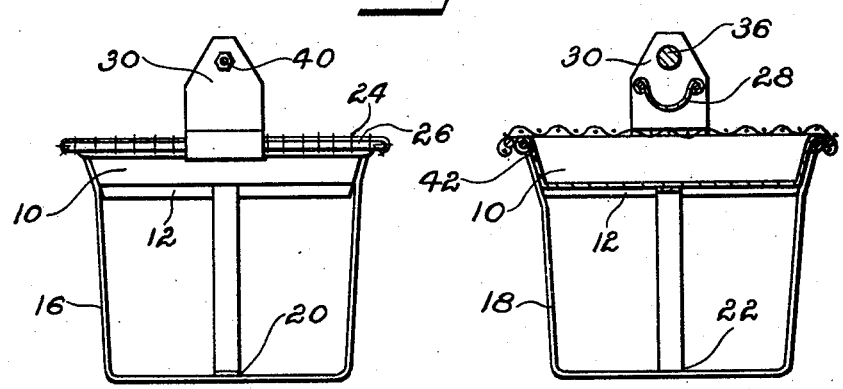

Other and more specific objects will be apparent from the following description taken in connection with the accompanying drawings, wherein:

Figure 1 is a perspective view of my device.
Figure 2 is a top plan view of the same.
Figure 3 is a side elevation of my device.
Figure 4 is a longitudinal sectional view of Figure 3.
Figure 5 is an end elevation of my device showing the supporting means I employ.
Figure 6 is a cross-sectional view along the line 6—6 of Figure 4.
Figure 7 is a fragmentary cross-sectional view through the floor screen of my device.

Referring to the drawings throughout which like reference numerals indicate like parts, numeral 10 designates the drip pan of my device, which also forms the general framework of the same. This I prefer to make rectangular in shape fairly shallow and with a gradual slope of the bottom 12 to one end so that a drain pipe 14 may be employed to drain off the surplus water collected. The exact manner of supporting my drip pan is relatively unimportant. The means I have shown, however, has proven very satisfactory and is very easily made. It consists of one U shaped member at each end of my device as 16 and 18. I then employ an inverted V which is secured at its mid point to the bottom of the drip pan and secured at its outer ends at 20 and 22 to the end support members 16 and 18 respectively.

Lying upon the upper surface, or more properly, the upper edges of my drip pan is a wire mesh screen of sufficient strength to easily hold the weight of as many chickens as can find standing room thereon.

The mesh of the screen should be such that the smallest chickens who use the watering trough can stand on the screens easily, and yet not so small that the largest chickens could ever get one of its toes caught in the screen.

I prefer to make my screen 24 with a heavy wire 26 running entirely around the same and with the screen bent around the wire and secured thereto. This gives in effect a screen panel which can be easily handled as a unit when it is desired to remove the same, and the down turned portion serves to prevent the screen being displaced from the drip pan once it has been put in place.

Disposed longitudinally of my drip pan and substantially in the centre thereof, is my watering trough 28. This I normally prefer to make of sheet metal, although many of the wood troughs work equally well. I then provide supporting brackets 30 at each end of my trough. These I prefer to have a foot portion 32 to support the weight of the trough, and a downwardly extending flange member 34. The purpose of the flange members is to prevent longitudinal movement of the trough.

I have also found it desirable to place a bar or rod 36 immediately above the centre of the watering trough so that while it is still convenient for the chickens' use they cannot climb up into the trough itself. This helps to keep the water clean and encourage the chickens to drink. The exact manner of securing a bar 36 in place is immaterial, however, I have found that if a round rod is used and if round bolts 40 are used the bar will then revolve readily whenever a chicken attempts to roost upon the same.

Where it is desired to use my trough with running water I provide an overflow at 42. This overflow discharge must be taken care of by suitable piping.

The foregoing description and the accompanying drawings clearly disclose a preferred embodiment of my invention but it will be understood that this disclosure is merely illustrative and that such changes in the invention may be made as are fairly within the scope and spirit of the following claim:

What I claim is:

A poultry watering device comprising a drip pan having supporting legs, a removable mesh-screen on the top of the pan forming a floor for the poultry, a longitudinally disposed trough above the screen, brackets forming end walls of the trough, each of said brackets having an integral foot-plate supported on the mesh-screen and pan and a retaining flange overhanging an end wall of the pan, a pair of bolts fixed in the brackets, and a guard-bar disposed longitudinally of and above the trough and journaled to revolve on said bolts.

In witness whereof, I hereunto subscribe my name this 2nd day of April, A. D. 1930.

ALFRED NEILSEN.